United States Patent [19]

Trahan

[11] Patent Number: 4,838,921
[45] Date of Patent: Jun. 13, 1989

[54] PLUNGER ASSEMBLY FOR A GLASSWARE FORMING MACHINE

[75] Inventor: Albert J. Trahan, Vernon, Conn.

[73] Assignee: Emhart Industries, Inc., Farmington, Conn.

[21] Appl. No.: 207,344

[22] Filed: Jun. 15, 1988

[51] Int. Cl.$^4$ .................... C03B 11/12; C03B 11/06
[52] U.S. Cl. ........................ 65/229; 65/319; 65/323; 65/356; 65/362
[58] Field of Search ................ 65/229, 319, 323, 356, 65/362

[56] References Cited

U.S. PATENT DOCUMENTS

| | | | |
|---|---|---|---|
| 1,942,042 | 1/1934 | Zimber et al. | 65/323 X |
| 3,148,969 | 9/1964 | Mathias | 65/362 X |
| 4,272,273 | 6/1981 | Trahan et al. | 65/323 X |
| 4,636,240 | 1/1987 | Kozora | 65/229 |

Primary Examiner—Arthur Kellogg
Attorney, Agent, or Firm—Spencer T. Smith

[57] ABSTRACT

A plunger assembly is provided wherein the precise centering of the perforated section of the cooling tube within a plunger of an I.S. type glass forming machine is achieved by securing the cooling tube to the plunger. The base of the plunger has a recess which wedgingly receives a plurality of equally spaced wedge elements secured to an annular collar fixed to the cooling tube. The wedge elements are sufficiently tall that they will extend beyond the plunger base, thereby defining exit openings through which plunger cooling air can be discharged.

3 Claims, 5 Drawing Sheets

PLUNGER ASSEMBLY FOR A GLASSWARE FORMING MACHINE

The present invention relates to individual section glassware forming machines which form glassware in the press and blow process, and more particularly, to the plunger mechanism of such machines which presses a molten gob of glass into a parison or preform. A plunger mechanism is disclosed in U.S. Pat. Nos. 4,272,273 and 4,636,240.

It is extremely important that this cooling tube be located and maintained precisely centered within the plunger so that cooling will take place uniformly around the plunger.

It is accordingly an object of the present invention to provide a plunger mechanism which includes a cooling tube which will be precisely centrally maintained within the plunger of the plunger mechanism.

Other objects and advantages of the present invention will become apparent from the following portion of this specification and from the accompanying drawings which illustrate in accordance with the mandate of the patent statutes, a presently preferred embodiment incorporation the principles of the invention.

Referring to the drawings.

Figure 2:
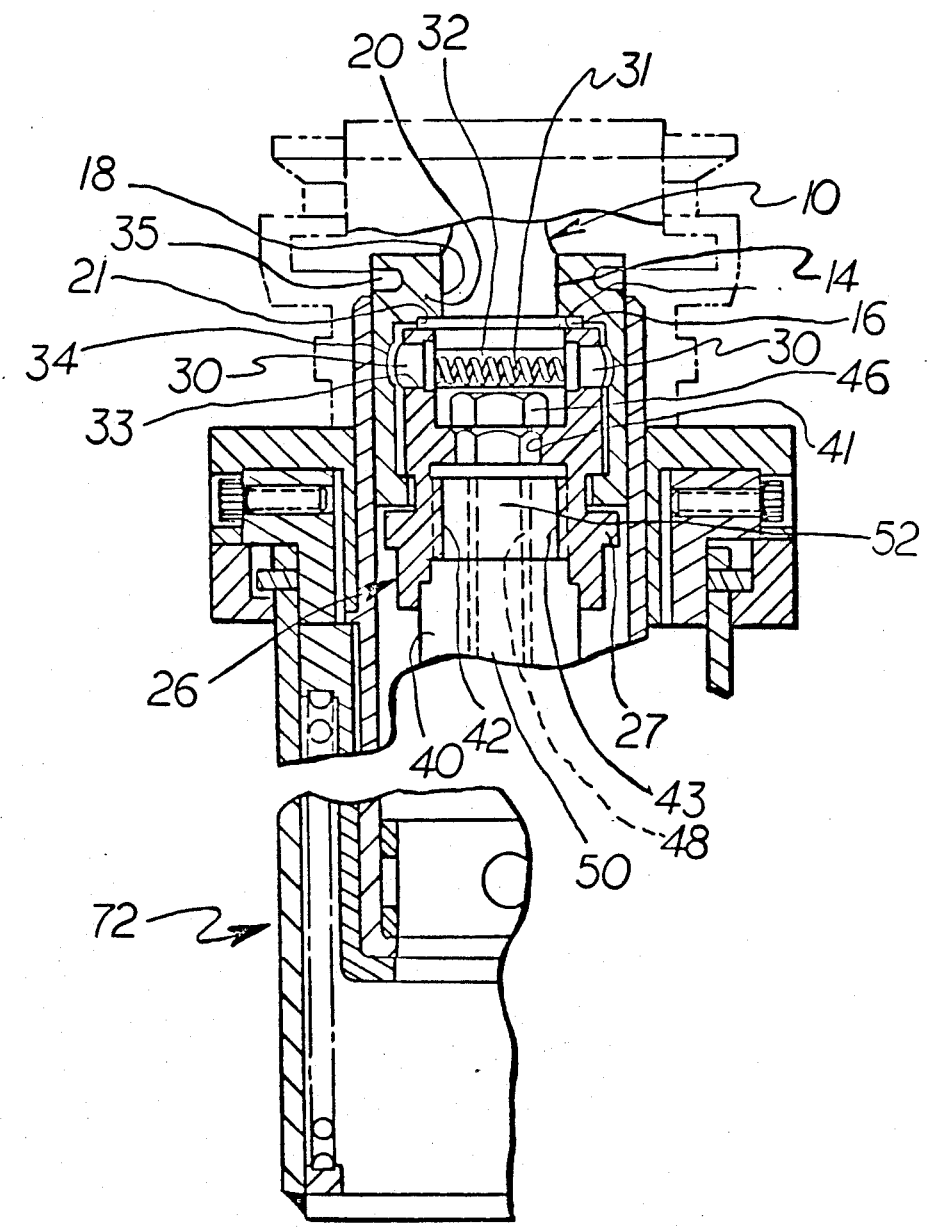
FIG. 2 is an axial cross-sectional view of the adapter assembly mounting the plunger to the vertically reciprocating piston of one of the cylinders in an individual section forming machine.
Figure 3:
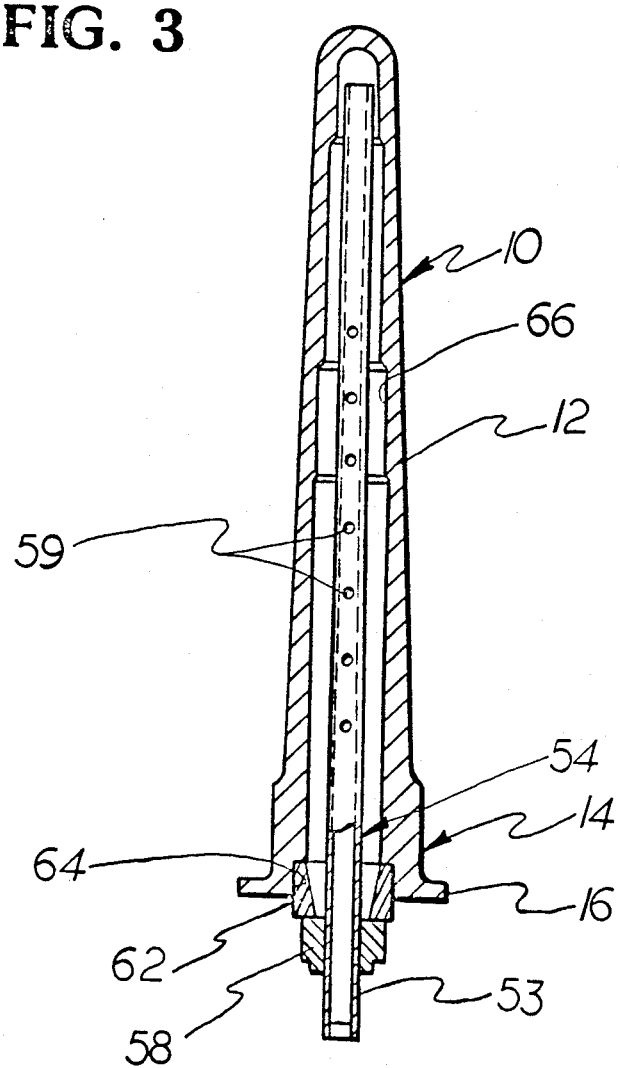
FIG. 3 is an axial cross-sectional view of the plunger with its cooling tube secured thereto.
Figure 4:
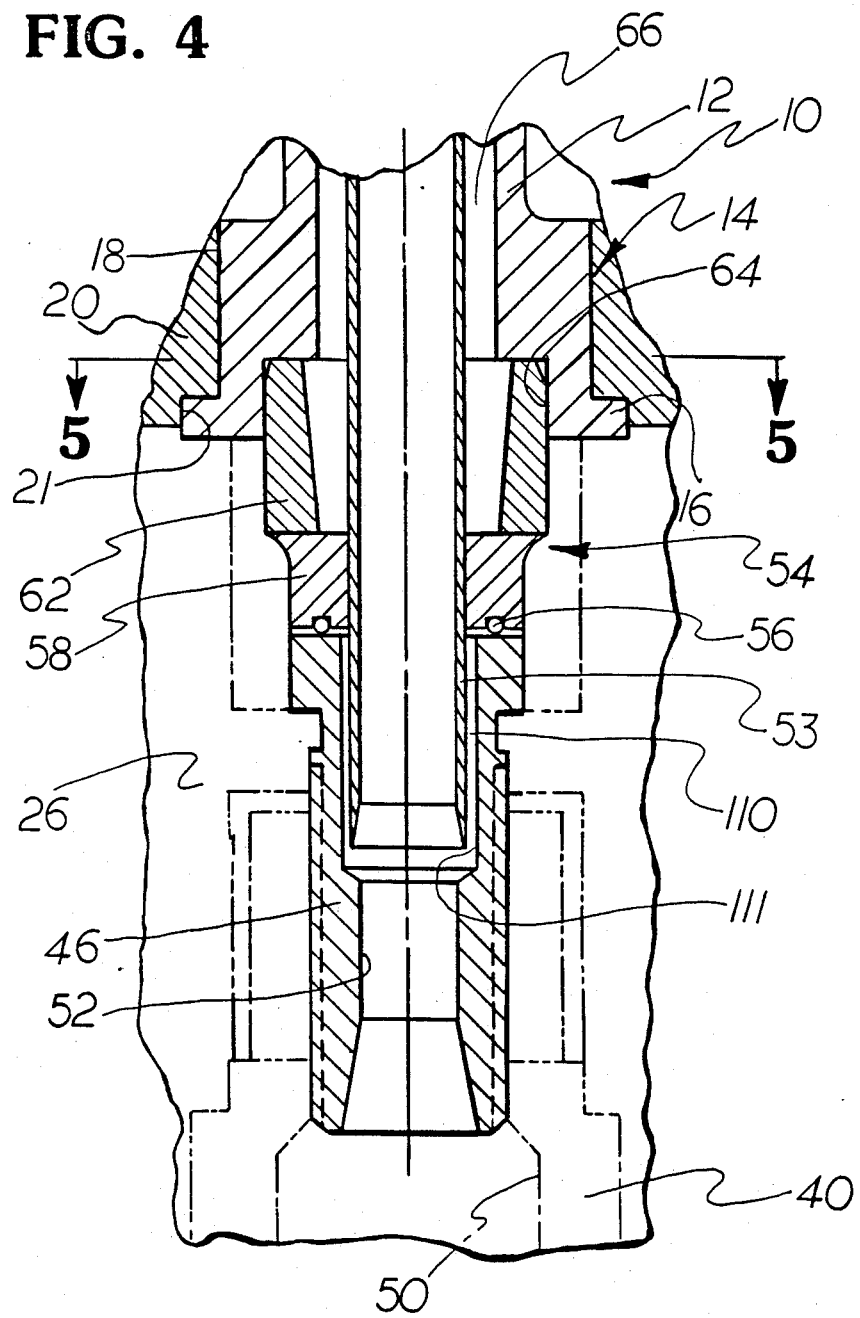
FIG. 4 is an enlarged view similar to that of FIG. 3 illustrating the lower portion of the adapter assembly secured to the reciprocating piston.

The plunger assembly includes a hollow plunger element 10 which has an elongated tapered upper or plunger portion 12 (FIG. 3) and a cylindrical bottom or base portion 14 which ends in an annular flange 16. The cylindrical base portion 14 is press fitted into a thru-bore 18 in the top wall of a plunger holder 20 (FIGS. 2 and 4). This thru-bore 18 is suitably recessed 21 to partially receive the annular flange 16 thereby defining the bottom surface of the plunger element 10 as a bearing surface. The plunger holder 20 is cylindrical in shape having an open bottom 24, which is partially closed by a pair of opposed, inwardly extending locking flanges 25.

The plunger assembly also includes an adapter 26 which has an upper portion above annular collar 27. The upper portion has a cylindrical body 28 which has a pair of opposed increased diameter portions 29 which define an outer diameter corresponding to the inner diameter of the plunger holder opening 24. These increased diameter portions 29 are discontinued at diametrically opposed locations to reduce the outer diameter of the upper portion sufficiently to permit the lowering of the plunger holder over the upper portion of the adapter when the location of these reduced diameter portions correspond to the location of the locking flanges 25. When the plunger holder is fully lowered, the bearing surface of the plunger base will engage the upper surface X of adapter 26.

The distance between the plunger bearing surface and the upper surface of these locking flanges 25 corresponds to the vertical height of the increased diameter portions 29 so that when the plunger holder 20 is fully lowered onto surface X of the adapter 26, the plunger holder can be rotated 90° to locate the locking flanges 25 between these increased diameter portions 29 and the adapter collar 27, thereby preventing vertical separation of the plunger holder and the adapter. An opposed pair of detents 30, which are biased outwardly through detent apertures 33 (FIG. 2) by a spring 31 contained within a suitable groove 32 in the plunger adapter and which enter recesses 34 in the plunger holder when so rotated, prevent the unintentional rotation of the plunger holder 20 relative to the adapter 26. There are four recesses; two to locate the retain adapter in position and two to locate the adapter for removal. To join these pieces together by locating the detents in their associated recesses 34 or to release them, a tool (not shown) can be used which has opposed keys for engaging opposed holder slots 35. A pair of notches 34a are cut in the inner wall of the holder at the bottom to cam the detents inwardly as the plunger holder is lowered onto the adapter.

To join the plunger assembly to the vertically reciprocating piston 40, the bottom of the adapter has an upwardly extending threaded bore 42 which threads onto a threaded portion 43 on the top of the piston 40. A hex opening 41 permits the use of a hex head tool to thread the adapter onto the piston. To lock these members together, a bolt 46 extends downwardly through the hex opening 41 in the adapter and is threadedly received by a threaded bore 48 in the top portion of the piston 40.

Figure 1:
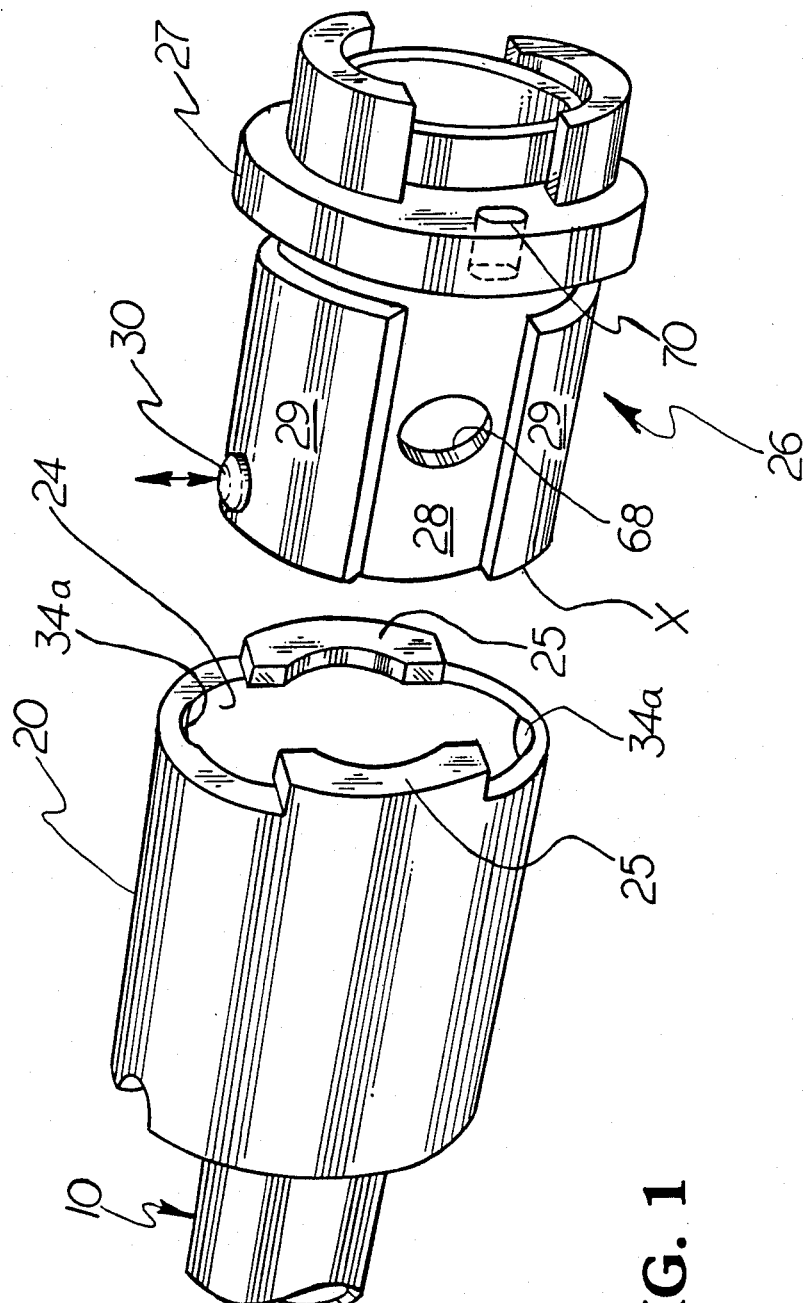
FIG. 1 is an oblique, exploded view of the plunger, the plunger holder and adapter of the plunger adapter assembly made in accordance with the teachings of the present invention.
Figure 5:
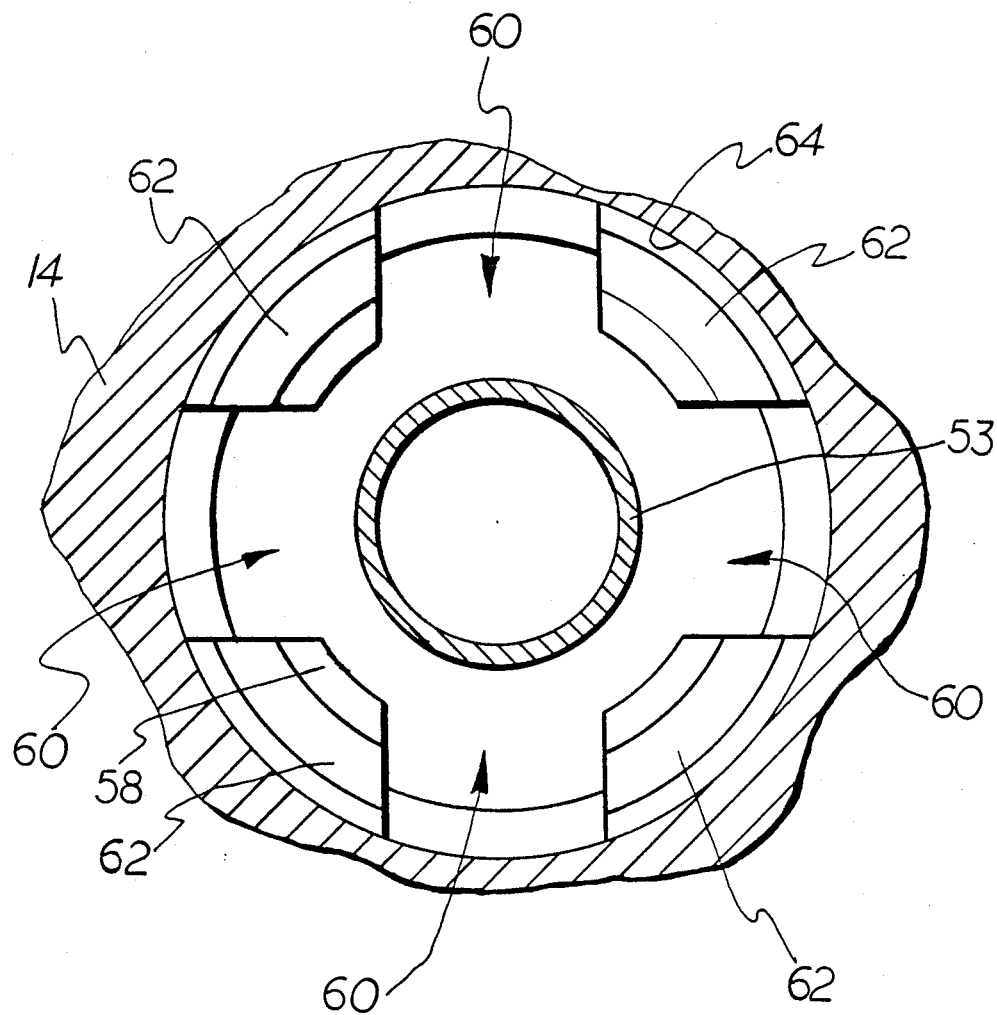
FIG. 5 is a view taken along the lines 5—5 of FIG. 4.

Cooling air is supplied upwardly through the center hole 50 of the piston 40 (FIG. 4), through the center hole 52 of the locking bolt 46 and then through the elongated tube 53 of the cooling tube assembly 54 (an "O" ring 56 effects a seal between the locking bolt 46 and the annular collar 58 of the cooling tube assembly to which the cooling tube is secured) and out holes 59 in the side of and a hole at the end of the cooling tube. This air flows downwardly along the plunger and outwardly through the openings 60 (see FIG. 5) between four wedge elements 62 of the cooling tube assembly, which are integral with the annular collar 58 and which are wedgingly received within a recess 64 defined at the entrance of the plunger opening 66 to secure and maintain the cooling tube in precisely centered and axially located within the plunger throughout the operation of the plunger assembly. Since the air has been heated, it has a greater volume than the inleted air. Accordingly, the size of this collective opening 60 should be at least two and one half times larger than the area of the cooling tube 53. The exhausted, heated air passes through opposed holes 68 (FIG. 1) in the adapter upper portion and flows downwardly through the channels formed between the enlarged diameter sections 29, the upper body 28 and the plunger holder 20 through holes 70 in the annular collar and into the plunger housing assembly 72 (FIG. 2).

I claim:

1. A plunger assembly for a glassware forming machine comprising:

a hollow plunger having an elongated tapered top portion and a base portion, a plunger holder having a top portion, aperture means in said plunger holder top portion for securely engaging said plunger base portion with said plunger top portion extending beyond said plunger holder top portion, cooling tube means including an elongated tube having a perforated top portion and an inlet portion, means for securing said cooling tube means to said plunger including annular recess means defined in said plunger base portion, annular collar means secured around said tube, a plurality of equally spaced wedges extending axially from said collar, said wedges adapted to be forcefully wedged into said annular recess of said plunger base portion until the tops thereof engage the top surface of said recess precisely centering and axially locating said perforated top portion within said tapered top plunger portion, and the distance between the top of said wedges and said collar and between said wedges being selected to define uniformly sized and spaced discharge openings having a collective area through which cooling air discharged from the cooling tube perforations can exit said plunger top portion.

2. A plunger assembly according to claim 1, wherein there are four wedges.

3. A plunger assembly according to claim 2, wherein the collective exit area defined between said wedges, the annular collar and said plunger base is at least 2.5 times the area of the inlet area of said cooling tube.

* * * * *